US008386058B2

(12) United States Patent
Vau

(10) Patent No.: US 8,386,058 B2
(45) Date of Patent: Feb. 26, 2013

(54) METHOD AND DEVICE FOR ROBUST REJECTION OF PERIODIC DISTURBANCES IN AN AXIS-POSITION CONTROL LOOP

(75) Inventor: Bernard Vau, Saint Maur des Fosses (FR)

(73) Assignee: Ixblue, Marly-le-Roi (FR)

( * ) Notice: Subject to any disclaimer, the term of this patent is extended or adjusted under 35 U.S.C. 154(b) by 926 days.

(21) Appl. No.: 12/437,046

(22) Filed: May 7, 2009

(65) Prior Publication Data

US 2009/0281670 A1 Nov. 12, 2009

(30) Foreign Application Priority Data

May 7, 2008 (FR) ...................................... 08 53025

(51) Int. Cl.
*G05B 13/02* (2006.01)
(52) U.S. Cl. ................ 700/54; 700/28; 700/29; 700/30; 700/55
(58) Field of Classification Search .................... 700/28, 700/29, 30, 54, 55, 67
See application file for complete search history.

(56) References Cited

U.S. PATENT DOCUMENTS 7,253,579 B2 8/2007 Vau

FOREIGN PATENT DOCUMENTS

FR 2 887 044 A1 12/2006

OTHER PUBLICATIONS

International Search Report dated Jan. 28, 2009.
Wai-Chuen Gan et al., "Torque and Velocity Ripple Elimination of AC Permanent Magnet Motor Control Systems Using the Internal Model Principle", IEEE/ASME Transactions on Mechatronics, Jun. 2004, pp. 436-447, vol. 9, No. 9.
G. Champenois et al., "Implementation of R.S.T. Controllers for a Flexible Servo Considering Practical Limitations", Industrial Automation and Control, 1995, pp. 209-213.

*Primary Examiner* — Mohammad Ali
*Assistant Examiner* — Nathan Laughlin
(74) *Attorney, Agent, or Firm* — Young & Thompson

(57) ABSTRACT

A method and a device for robust rejection of the periodic disturbances in a motor-position control structure of the RST type, wherein the assembly including the motor, the position sensor, the element for computing the functions $1/So(z^{-1})$ and $Ro(z^{-1})$, in a loop, is called central controller. Within the framework of the invention, to the central controller are added two additional computing elements, the first one being an estimator block $E(z^{-1})$ and the second one a modifier block $Q(z^{-1})$, as well as an additional loop, the estimator block $E(z^{-1})$ allowing a load disturbance estimation signal $\hat{v}(t)$ to be computed, the modifier block $Q(z^{-1})$ receiving the load disturbance estimation signal $\hat{v}(t)$ as an input, to produce a modified signal, which is applied to a negative input of an additional adder arranged upstream from the element for computing the function $1/So(z^{-1})$ and then forming the additional loop, the modifier block having a variable transfer function.

13 Claims, 10 Drawing Sheets

Figure 1:
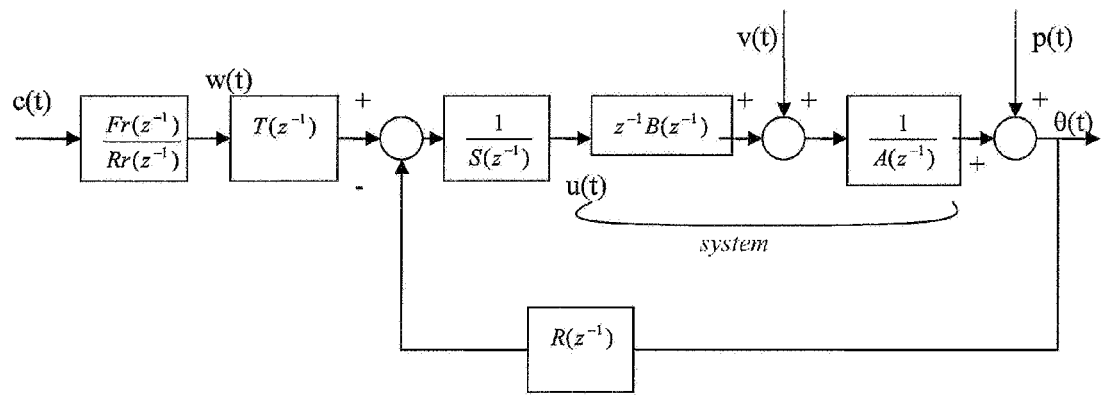

METHOD AND DEVICE FOR ROBUST REJECTION OF PERIODIC DISTURBANCES IN AN AXIS-POSITION CONTROL LOOP

The present invention relates to a method and a device for robust rejection of periodic disturbances in an axis-position control loop. It finds applications in the field of automation in which controlled electric motors are implemented and in particular within feedback or control loops. In particular, it applies to motion simulators.

Nowadays AC brushless motors are widely used in the field of axis control. Indeed, these motors are synchronous motors to which is added electronics allowing self-control of the motor. The self-control is intended to make the torque produced by the motor proportional to the amplitude of an input command of the electronics.

Such torque-control linearity is a very appreciable property as it makes it possible to use linear algorithms for controlling the motor-axis speed or position. Moreover, thanks to the use of a brushless motor, the machine is guaranteed a minimum maintenance.

The motion of the controlled axis can be subjected to periodic disturbances depending on the position of said axis. Such disturbances may notably come from torque ripples of the self-controlled motor that are never fully reducible in spite of manufacturers' efforts. The torque ripples have multiple origins. They may come from the cogging torque which is due to the interaction between the permanent magnets and the stator teeth, but also from the reluctance torque, the mutual torque, or the direct current offsets of the current sensors in the control electronics. In practice, the predominant origin depends on the motor type and on the manufacturer. Anyway the torque ripple is a periodic phenomenon in relation to the angular position of the axis and the frequency thereof is proportional to the angular speed of said axis.

Another source of periodic disturbance on an axis lies in the sensor that measures the position of said axis. In case an incremental encoder is used, methods based on diffracting grating make it possible to know the axis position between two lines of the encoder. Such a method, known as "position interpolation", is not perfect and induces a non-linearity in the angular position measurement that is quasi-reproducible from one encoder line to another. In this case also, the non-linearity induced by this phenomenon is periodic and proportional to the axis angular speed.

In a classical control loop, wherein the controlled variable is either the position or the angular speed of the axis, such periodic disturbances create ripples of the axis angular speed that may be an inconvenience for some applications. This is notably the case for the mechanical motion simulators that are systems generally intended to test inertial units and in which the speed stability is a determining factor for the system quality.

Several methods making it possible to attenuate such periodic disturbances have been proposed to limit the effect thereof. These methods can be divided into three main categories.

In the first category, it is the machine design which is optimized. For example, regarding the motor, the design notably permits to eliminate the cogging torque and the reluctant torque. This work may be done only by the motor manufacturer.

In the second category, adaptive control methods are used. In such adaptive controls, the ripple amplitude and phase are estimated by means of an appropriate algorithm and used in a motor controller to compensate for the disturbances. It is to be noted that such methods are efficient only if the ripple amplitudes are constant over 360 degrees, which is not necessarily the case. In the opposite case, the obtained compensation is only partial.

The third category includes the algorithms for controlling the axis speed or angular position that include a sinusoidal disturbance rejection at the frequency of the ripples. As said frequency varies as a function of the angular speed, the controller necessarily uses gains sequenced according to this angular function. However, in this case, the ripple rejection is done in a robust manner, that is to say it is not necessary to know the phase and amplitude of the torque disturbances to eliminate them. Accordingly, the disturbance frequency(ies) being proportional to the axis speed, it is possible to use the speed reference input to estimate this/these frequency(ies). The ratio of proportionality between the frequency and the speed is constant and depends on the motor design.

The present invention pertains to this third category and notably allows rejection of those periodic disturbances whose frequency depends on the rotational speed of a controlled motor-axis.

Within this third category, it can be mentioned the prior document, published in "IEEE/ASME Transactions on mechatronics", Vol. 9 n°2, June 2004, entitled "Torque and velocity ripple elimination of AC permanent magnet motor control systems using the internal model principle" and the authors of which are Wai-Chuen and Li Qui.

These authors propose a method for controlling the speed of an axis, based on a two-degree-of-freedom RST-type controller whose RST blocks are adapted according to said speed so as to reject the static disturbances and the sinusoidal disturbances, of variable frequency, of the periodic disturbances.

However, for various reasons, this document will not lead directly to industrial application:

The authors do not describe a controller-setting methodology that permits to make sure that, at any angular speed, the controller provides necessary static and dynamic margin levels to ensure the robustness of the loop.

The assembly of the authors applies to a speed loop. If the problem is transposed to a position loop, still having speed controlling in mind, the controller order increases. Now, because all the parameters of the RST blocks have to be computed in line, the volume of computations to be performed at each sampling period may quickly become too high, especially if the sampling period of the device is small, as it is often the case in the field of axes control.

The disturbance rejection is systematic, that is to say the choice is not leaved to activate or not the sinusoidal disturbance rejection.

For a best understanding of the invention, a classical two-degree-of-freedom RST-type controller having a reference input filter (pre-filter) will now be described, with a presentation of the general principles relating to the problems and solutions concerning the state of the art and the invention. The device corresponding to the RST controller with a reference input filter is symbolised in FIG. 1, with the following parameters:

c(t): position reference input,
w(t): reference input filter output,
θ(t): measured axis position,
u(t): control signal (system input)
v(t): load disturbance,
p(t): output disturbance.

In the general framework of the RST controllers, it can be mentioned the patent application FR07/52807, "Optimisation de la réponse fréquentielle d'un simulateur de mouvement par suivi adaptatif de consignes sinusoïdales", in which a reference input filter is implemented in a RST structure.

In FIG. 1, the transfer function $Rr(z^{-1})/Fr(z^{-1})$ forms the reference input filter intended, as its name indicates, to filter the reference input in case the latter would be, for example, too steep for the controller.

Given an axis to be controlled, connected to a self-controlled synchronous motor and to a position encoder measuring the position of said axis. Taking into account the self-control, the control signal $u(t)$ inputted to the control electronics is proportional to the torque produced by the motor. The position of the motor axis is denoted $\theta(t)$.

It is considered that the whole of dry and viscous frictions are disturbances acting on the torque.

In such conditions, by applying the fundamental principle of the dynamics, the transfer function between the control signal $u(t)$ and the position $\theta(t)$ may simply be written as:

$$\frac{\theta(t)}{u(t)} = \frac{b}{s^2}$$

where b is proportional to 1/J and J is the inertia of the system.

The system is sampled at the period Te. Let z be the operator advance of one sampling period. The transfer function of the discretized system having a zero-order hold is given by:

$$\frac{\theta(t)}{u(t)} = \frac{0.5 \cdot b \cdot Te^2 \cdot z^{-1} + 0.5 \cdot b \cdot Te^2 \cdot z^{-2}}{1 - 2z^{-1} + z^{-2}}$$

The transfer function between $w(t)$ and $\theta(t)$ is given by:

$$\frac{\theta(t)}{w(t)} = \frac{z^{-1}T(z^{-1})B(z^{-1})}{A(z^{-1})S(z^{-1}) + z^{-1}B(z^{-1})R(z^{-1})}$$

In the presence of output disturbances and of the load disturbances, the sensitivity functions of the system are defined as follows:

$S_{\theta p}$: Transfer function between the output disturbance $p(t)$ and the output $\theta(t)$ $S_{\theta v}$: Transfer function between the load disturbance $v(t)$ and the output $\theta(t)$.

From FIG. 1, the following relations can be deduced:

$$S_{\theta p} = \frac{\theta(t)}{p(t)} = \frac{A(z^{-1})S(z^{-1})}{A(z^{-1})S(z^{-1}) + z^{-1}B(z^{-1})R(z^{-1})}$$

$$S_{\theta v} = \frac{\theta(t)}{v(t)} = \frac{S(z^{-1})}{A(z^{-1})S(z^{-1}) + z^{-1}B(z^{-1})R(z^{-1})}$$

Let $\omega(t)$ be the axis angular speed, i.e. the derivative of the angular position $\theta(t)$, the following relation is true:

$$\omega(t) = \frac{1-z^{-1}}{Te} \cdot \theta(t)$$

An additional transfer function between the load disturbance $v(t)$ and the axis angular speed $\omega(t)$, denoted $S_{\omega v}$, can thus be defined.

It may be written as:

$$S_{\omega v} = \frac{\omega(t)}{v(t)} = \frac{S(z^{-1}) \cdot (1-z^{-1})/Te}{A(z^{-1})S(z^{-1}) + z^{-1}B(z^{-1})R(z^{-1})}$$

Moreover, it can be shown that the transfer function between the load disturbance $v(t)$ and the relative variations of the axis angular speed $$\frac{\Delta\omega(t)}{\omega(t)}$$

is equal to $S_{\theta v}$.

The controller setting is performed in conventional manner by specifying an arbitrary stability polynomial $D(z^{-1})$, then $S(z^{-1})$ and $R(z^{-1})$ are computed such that:

$$A(z^{-1})S(z^{-1}) + z^{-1}B(z^{-1})R(z^{-1}) = D(z^{-1}),$$

the latter equation being a polynomial equation, known as "Bezout equation", the solving of which implies to solve a linear system called "Sylvester system".

It can be noted that the degree of $D(z^{-1})$ is necessarily at least equal to 2n, where n is the degree of $A(z^{-1})$.

In order to ensure the robust rejection of the disturbances on the system input or on the output, the block S in the Bezout equation must be specified. More precisely, the block S needs to be writable as:

$$S(z^{-1}) = Hs(z^{-1}) \cdot S'(z^{-1})$$

Such pre-specification method is known as the "internal model" method.

The Bezout equation then becomes:

$$A(z^{-1})Hs(z^{-1})S'(z^{-1}) + z^{-1}B(z^{-1})R(z^{-1}) = D(z^{-1})$$

The unknowns are now $S'(z^{-1})$ and $R(z^{-1})$.

To robustly reject the static disturbances, the equation to be considered is:

$$Hs(z^{-1}) = 1 - z^{-1}$$

To reject a sinusoidal disturbance at the frequency f, the equation to be considered is:

$$Hs(z^{-1}) = (1 - 2\cos(2\pi f Te)z^{-1} + z^{-2})$$

To reject a static disturbance as well as a sinusoidal disturbance, Hs need to be as follows:

$$Hs(z^{-1}) = (1 - z^{-1}) \cdot (1 - 2\cos(2\pi f Te)z^{-1} + z^{-2})$$

Figure 2:
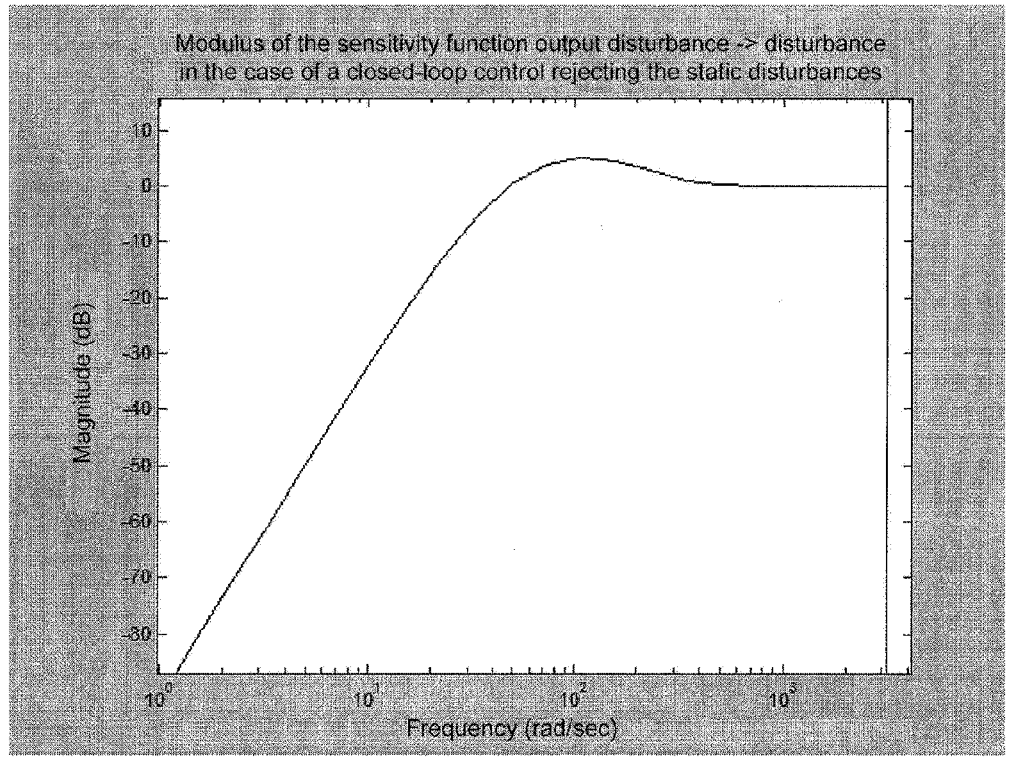
Figure 3:
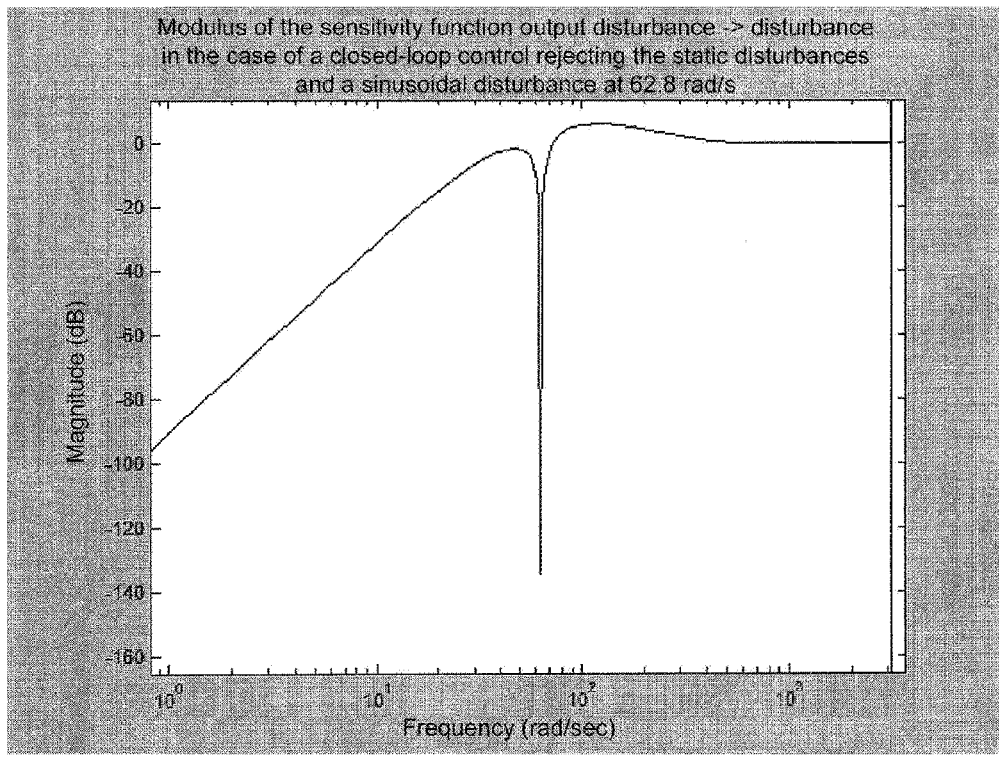

It can thus be seen that disturbances of various natures can be rejected. In particular, this rejection results, in the curve of the modulus of the sensitivity function $S_{\theta p}$ (of an output disturbance toward the output), by a modulus equal to zero at the specified frequency of the rejection, as can be seen in FIGS. 2 and 3.

In particular, it can be shown that, when considering the system as a double integrator and $H_s$ as containing a zero in +1, then the modulus of the sensitivity function $S_{\theta p}$ has a slope of +60 dB/decade for low frequencies and a slope of 0 db/decade for high frequencies. Under the same conditions, the slopes of the modulus of $S_{\theta v}$ are of +20 dB/decade for low frequencies and −40 dB/decade for high frequencies.

Figure 4:
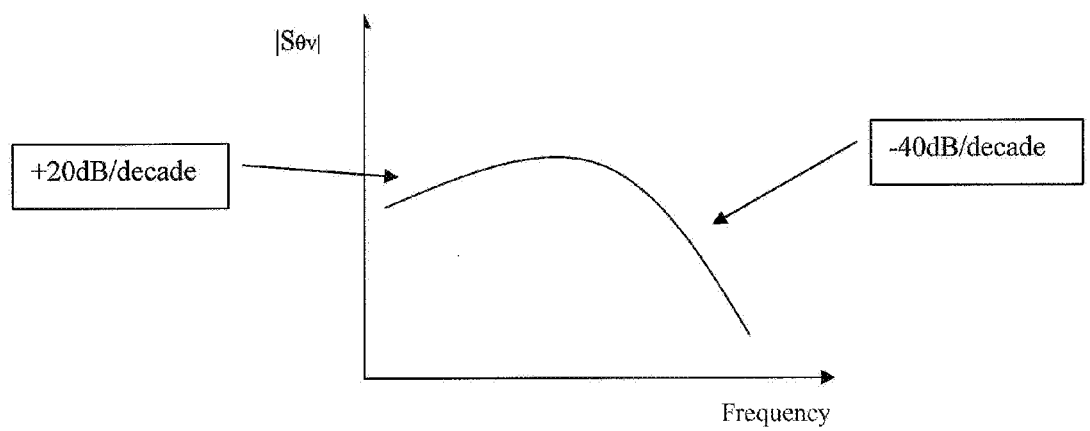

The shape of the modulus of $S_{\theta v}$ as a function of the frequency that is deduced is shown in FIG. 4. The corresponding function presents a maximum and it can be seen that a critical frequency area exists, in which the load disturbances are particularly emphasized.

It could be think at first sight that disturbance rejection is possible at any desired frequency. But it is unfortunately not the case because of a fundamental theorem of control science, namely the Bode-Freudenberg-Looze theorem. This Bode-Freudenberg-Looze theorem may be written as follows:

$$\int_0^{0.5Fe} \ln(|S_{\theta p}(e^{-j2\pi f/Fe})|) df = 0$$

Figure 5:
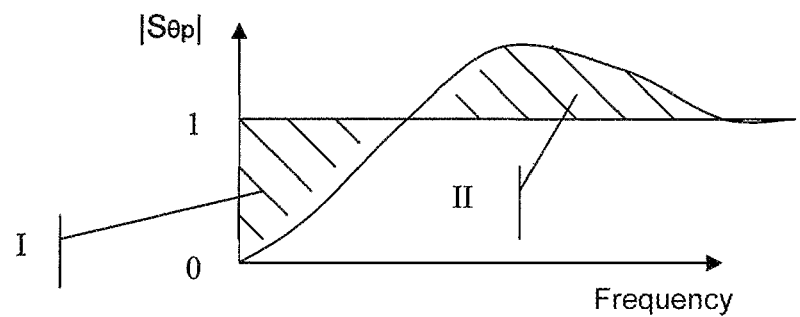

This theorem is valid for those systems whose relative degree (difference between the degree of the numerator and that of the denominator of the transfer function) is at least equal to 2. It results in that, in the modulus function of the sensitivity $S_{\theta p}$, which is schematically shown in FIG. 5, the areas I and II are necessarily equal to each other.

Therefore, any rejection "notch" created in the sensitivity function $S_{\theta p}$ necessarily leads to an increase of the modulus of this function at another frequency. Therefore, it is not possible to multiply indefinitely the rejection of sinusoidal disturbances.

The control method exposed in the article by Wai-Chuen et al. consists in supposing that the periodic disturbances are strictly sinusoidal. Moreover, the knowledge of the axis angular speed ω makes it possible to infer the frequency f of these disturbances.

Wai-Chuen et al. propose therefrom to compute in line the coefficients of the controller RST-blocks, according to the internal model principle, by solving at each sampling period the above-described Bezout equation:

$$A(z^{-1}) \cdot Hs(z^{-1}) + z^{-1} B(z^{-1}) R(z^{-1}) = D(z^{-1})$$

with:

$$Hs(z^{-1}) = (1 - z^{-1}) \cdot (1 - 2\cos(2\pi \cdot f \cdot Te) z^{-1} + z^{-2})$$

In this Bezout equation, $A(z^{-1})$ and $B(z^{-1})$ are fixed (parameters of the transfer function of the system to be controlled). Only the polynomial $Hs(z^{-1})$ varies over the time, as a function of the sinusoidal disturbance frequency. Finally, the polynomial $D(z^{-1})$ of the closed loop poles is also chosen to be fixed. The polynomial $R(z^{-1})$ is therefore computed in line.

It can be noticed that the above-mentioned authors perform the speed control of the axis. More precisely, in the case they considered, the system to be controlled is of first order, so that the degree of the polynomial $R(z^{-1})$ to be computed in line is relatively simple because it is of order 3. Moreover, the number of poles placed by means of the polynomial $D(z^{-1})$ is of 4.

Now, in case a position control is required, the system to be controlled is of second order. The degrees of $R(z^{-1})$, $S(z^{-1})$, $T(z^{-1})$ are therefore higher, so that the volume of required computations for solving the Bezout equation substantially increases, which can create problems in the controller if the sampling period is short.

Moreover, the choice of Wai-Chuen et al. to keep the polynomial $D(z^{-1})$ fixed whatever the disturbance frequency to be rejected is limiting, insofar as the loop robustness is not optimized according to this disturbance frequency. Now, in an industrial context, it is important to make sure to ensure a minimal level of the closed-loop delay margin and modulus margin whatever said disturbance frequency. In particular, in case a disturbance rejection would inevitably result in lower margins than those specified, it is desirable not to perform this rejection. The latter possibility results in that the rejection of a sinusoidal disturbance might not take place at certain frequencies if the nature of said frequency inevitably leads to an unacceptable deterioration of the robustness margins.

Therefore, there is also a problem regarding the preservation of an acceptable delay margin, and general principles relating to the robustness of a loop system will now be described.

The notion of margins is used to measure the robustness of a loop system. The usual margins used in the mono-variable systems are:
  the modulus margin, and
  the delay margin.

The modulus margin is the distance of the open-loop frequency position from the point −1 in the Nyquist plane. It is a general indicator of the robustness of a linear control law. Generally, the modulus margin is specified greater than 0.5.

The delay margin represents the maximal value of the parasitic delay which could be introduced in the loop before the latter becomes unstable. Unlike the modulus margin, there is no general specification for the delay margin. The choice thereof pertains to a compromise between the robustness and the expected performance as regards the disturbance rejection.

Let MM be the modulus margin, it is shown that:

$$MM = \frac{1}{|S_{\theta p}|_\infty}$$

More precisely, the modulus margin is equal to the inverse of the maximum value of the modulus of the sensitivity function $S_{\theta p}$.

Therefore, when it is further required, from a conventional RST loop central system rejecting the static disturbances, to eliminate a sinusoidal disturbance (while keeping wholly the same static rejection performance), the rejection "notch" created at the corresponding frequency will lead to a rise of the modulus of $S_{\theta p}$ for the other frequencies, and in particular those whose modulus is higher than 1 (cf. Bode-Freudenberg-Looze theorem). Accordingly, it may be thought that, in the general case, the modulus margin will be reduced by the addition of this sinusoidal disturbance rejection (everything being otherwise equal). Thus, it is already observed that the addition of a sinusoidal disturbance rejection to a loop system initially rejecting the static disturbances is not without effect on the loop robustness.

The consequences on the delay margin of the loop system are also significant. In case the rejection of a sinusoidal disturbance is supposed to be fully performed at the frequency fo, it can be shown that the delay margin of the loop system is constrained by this rejection.

In particular, let MR be the delay margin of a loop system, it is shown that the perfect rejection of a sinusoidal disturbance at a frequency fo (in Hertz) gives the inequality:

$$MR < \frac{1}{4 \cdot fo}$$

Therefore, a significant consequence is deduced: so as to guarantee a delay margin MRc to a loop system, the sinusoidal disturbances rejection can be performed at every frequency. This disturbance rejection is only possible for frequencies f such as:

$$f < \frac{1}{4 \cdot MRc}$$

Because, on the one hand, the perfect sinusoidal disturbance rejection is not possible at any frequency, and considering, on the other hand, the shape of the modulus of $S_{\theta v}$, the depth of the disturbance rejection would better be modulate as a function of the frequency. Now, it has been seen above that the modulus of $S_{\theta v}$ in the case of static disturbance rejection has a shape as schematically shown in FIG. 4.

Hence, it is desirable to have a control strategy different from what is known, also based on a fixed RST-type controller structure, but which avoids notably the above-mentioned problems and allows an effective operation.

Moreover, within the framework of a varying-parameter control law, it is necessary that the rejection means can be disabled (for example through a switch at the output of a modifying block or by setting to zero the output of such block, with or without stopping the computations for said block), in particular in case the disturbance frequency is too great with respect to a criterion such as that above-mentioned.

The present invention achieves this purpose by adding to a fixed RST-type controller structure a block for estimating the load disturbance of the system, as well as an additive transfer block whose parameters are computed in line and vary as a function of the axis speed. The output of the additive transfer block is injected at a particular point of the fixed RST controller. The result is that it is also possible to decide to inject or not this output of the additive transfer block, i.e. to reject or not the sinusoidal disturbances. The role of this additive transfer block is to create one or more attenuations in the sensitivity function of the system between a load disturbance and the output of the system, at the periodic disturbance frequencies, while modifying the least possible said sensitivity function at the other frequencies. Within the framework of the invention, it is also proposed a method for off-line setting the R, S and T parameters, associated with a method for computing the additive block parameters so as to make sure that, at any disturbance frequency, predefined delay margin level and modulus margin level are guaranteed, so as to ensure the system robustness. In some alternative embodiments, it is possible to implement a reference input pre-filter upstream from the RST device having estimation and transfer blocks.

The invention thus relates to a method for robust rejection of the periodic disturbances in a motor-position control structure, the periodic disturbances being liken to at least one sinusoidal oscillation at a determinable frequency proportional to the axis speed, the control structure receiving a position reference input signal c(t) implementing a loop for controlling the position said motor axis, said control structure being of the RST controller type and being sampled so that numerical computations can be made in a programmable calculator to produce results intended to control the motor, the RST controller implementing computing means corresponding, on the one hand, to a function $1/So(z^{-1})$ upstream from the motor and producing a control signal u(t) and, on the other hand, a function $Ro(z^{-1})$ in the loop thereof which receives as an input a position signal θ(t) from a position sensor on said motor axis, wherein the assembly including the motor, the position sensor, the means for computing the functions 1/So $(z^{-1})$ and $Ro(z^{-1})$, in a loop, is called central controller.

According to the invention:
- to the central controller are added two additional computing means, the first one being an estimator block $E(z^{-1})$ and the second one a modifier block $Q(z^{-1})$, as well as an additional loop,
- the motor is modeled as a modeled system subjected to a load disturbance v(t), said modeled system receiving the control signal u(t) as an input and producing the position signal θ(t) as an output, the system model applying a function $z^{-1}B(z^{-1})$ to the control signal u(t) to produce a signal added to the load disturbance v(t), the resultant being subjected to a function $1/A(z^{-1})$ to produce the position signal θ(t),
- a load disturbance estimation signal v̂(t) is computed in the estimator block $E(z^{-1})$ that receives the control signal u(t) as a first input and the position signal θ(t) as a second input, and in which the control signal u(t) is subjected to the function $z^{-1}B(z^{-1})$ to produce a signal, which is then subtracted from the result of the application of the function $A(z^{-1})$ to the position signal θ(t), this subtraction giving the load disturbance estimation signal v̂(t),
- the load disturbance estimation signal v̂(t) is applied to the modifier block $Q(z^{-1})$ to produce a modified signal, which is applied to a negative input (the result being that the modified signal is subtracted from the other signal arriving to the adder) of an additional adder arranged upstream from the means for computing the function $1/So(z^{-1})$ and then forming the additional loop, the modifier block having a transfer function that varies as a function of the at least one determinable frequency and which is computed in real or quasi-real time under the constraint that the position sensitivity function $S_{\theta p}$ of the control structure comprises a notch for the at least one determinable frequency.

In various embodiments of the present invention, the following means are used, either alone or in any technically possible combination:
- the additional loop is internal to the loop in $Ro(z^{-1})$ of the central controller, the additional adder being arranged just upstream from the means for computing the function $1/So(z^{-1})$,
- the central controller is computed (synthesized) beforehand, off-line, to reject static disturbances and the functions So and Ro are stored to be directly used later during the real-time computations,
- during the central controller design in which is performed a step of determining a filtering horizon To and a command horizon Tc such that Tc <To, with preferably To/5<Tc<To/2, said step of determining the filtering horizon To and the command horizon Tc is performed under the constraint that whatever the frequency(ies) to be rejected (the frequencies that will be meet in practice), the delay margin is higher than a predetermined threshold delay margin mrc and the modulus margin is higher than a predetermined threshold modulus margin mmc,
- in the step of determining the filtering horizon To and the command horizon Tc under constraint, a set of minima of the delay margins and modulus margins is computed, wherein the minima are a function of the possible values of the frequency(ies) to be rejected and are also obtained by varying the values of To and Tc and, based on the set of minima for the delay margins and modulus margins, the values To and Tc are computed back, which make sure that the constraint that the delay margin is higher than a predetermined threshold delay margin mrc and the modulus margin is higher than a predetermined threshold modulus margin mmc is met and moreover, preferably, that To/5<Tc<To/2, the transfer function $Q(z^{-1})$ of the modifier block is computed (in line), considering the polynomial ratio $$Q(z^{-1}) = \frac{\beta(z^{-1})}{\alpha(z^{-1})}$$

having varying parameters, and the whole control structure is likened, by equivalence, to a RST controller in R and S of polynomial function blocs $$R(z^{-1}) = \alpha(z^{-1}) \cdot Ro(z^{-1}) + A(z^{-1}) \cdot \beta(z^{-1})$$

$$S(z^{-1}) = \alpha(z^{-1}) \cdot So(z^{-1}) - z^{-1} \cdot B(z^{-1}) \cdot \beta(z^{-1})$$

the polynomial function $S(z^{-1})$ is factorized as pre-specified into $S(z^{-1}) = Hs(Z^{-1}) \cdot S'(z^{-1})$ to bring out a term in $(1-z^{-1})$ corresponding to the static disturbance rejection and terms $S'(z^{-1})$ and $Hs1(z^{-1})$, wherein $S(z^{-1})$ is written $S(z^{-1}) = (1-z^{-1}) \cdot Hs1(z^{-1}) \cdot S'(z^{-1})$, and the polynomials Hs1 and $\alpha$ are determined by discretization of a continuous transfer function depending on the desired rejection level Mt at the considered frequency, the polynomial $\beta$ being then obtained by solving the following Bezout equation $$S'(z^{-1}) \cdot Hs(z^{-1}) + z^{-1} B(z^{-1}) \cdot \beta(z^{-1}) = So(z^{-1}) \cdot \alpha(z^{-1})$$

the continuous transfer function depending on the desired rejection level at the considered frequency, in the case of only one frequency $f_1$, is:

$$F(s) = \frac{s^2 + 2\xi_{num} \cdot 2\pi \cdot f_1 \cdot s + (2\pi \cdot f_1)^2}{s^2 + 2\xi_{den} \cdot 2\pi \cdot f_1 \cdot s + (2\pi \cdot f_1)^2}$$

the continuous transfer function depending on the desired rejection level at the considered frequency, in the case of two frequencies $f_1$ and $f_2$, is:

$$F(s) = \frac{s^2 + 2\xi_{num1} \cdot 2\pi \cdot f_1 \cdot s + (2\pi \cdot f_1)^2}{s^2 + 2\xi_{den1} \cdot 2\pi \cdot f_1 \cdot s + (2\pi \cdot f_1)^2} \cdot \frac{s^2 + 2\xi_{num2} \cdot 2\pi \cdot f_2 \cdot s + (2\pi \cdot f_2)^2}{s^2 + 2\xi_{den2} \cdot 2\pi \cdot f_2 \cdot s + (2\pi \cdot f_2)^2}$$

the rejection level Mt for a given frequency $f_i$ is computed by $Mt_i = 20 \cdot \log(\xi num_i / \xi den_i)$, and preferably, the value taken for $\xi den_i$ is 0.1.

The invention also relates to a device for robust rejection of the periodic disturbances in a motor-position control structure, the periodic disturbances being liken to at least one sinusoidal oscillation at a frequency proportional to the axis angular speed, the control structure receiving a position reference input signal c(t) implementing a loop for controlling the position said motor axis, said control structure being of the RST controller type and being sampled so that numerical computations can be made in a programmable calculator to produce results intended to control the motor, the RST controller implementing computing means corresponding, on the one hand, to a function $1/So(z^{-1})$ upstream from the motor and producing a control signal u(t) and, on the other hand, a function $Ro(z^{-1})$ in the loop thereof which receives as an input a position signal θ(t) from a position sensor on said motor axis, wherein the assembly including the motor, the position sensor, the means for computing the functions $1/So(z^{-1})$ and $Ro(z^{-1})$, in a loop, is called central controller.

Said device according to the invention, forming a motor-position control structure, comprises, added to the central controller, means for implementing the method of any one of the preceding claims, said means being two additional computing means, the first one being an estimator block $E(z^{-1})$ and the second one a modifier block $Q(z^{-1})$, as well as an additional loop, the estimator block $E(z^{-1})$ allowing a load disturbance estimation signal $\hat{v}(t)$ to be computed, said estimator block receiving the control signal u(t) as a first input and the position signal θ(t) as a second input, the modifier block $Q(z^{-1})$ receiving the load disturbance estimation signal $\hat{v}(t)$ as an input to produce a modified signal, which is applied to a negative input (the result being that the modified signal is subtracted from the other signal arriving to the adder) of an additional adder arranged upstream from the means for computing the function $1/So(z^{-1})$ and then forming the additional loop, the modifier block having a transfer function that varies as a function of the at least one determinable frequency and which is computed in real or quasi-real time under the constraint that the position sensitivity function $S_{\theta p}$ of the control structure comprises a notch for the at least one determinable frequency.

Figure 6:
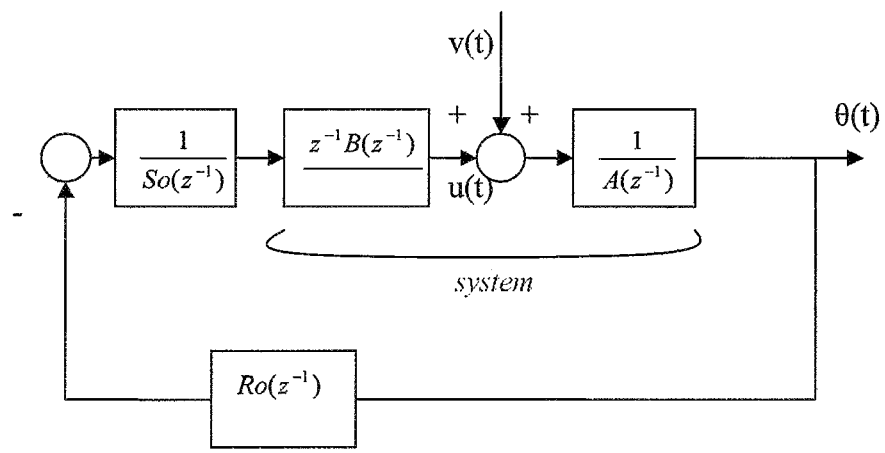
Figure 7:
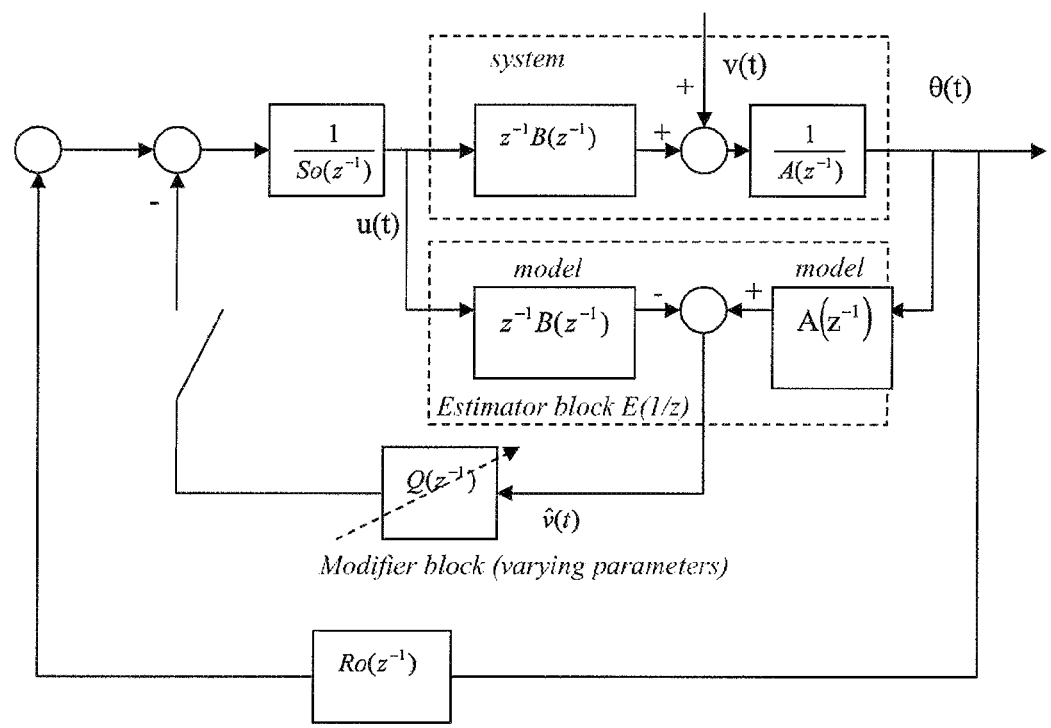
Figure 8A:
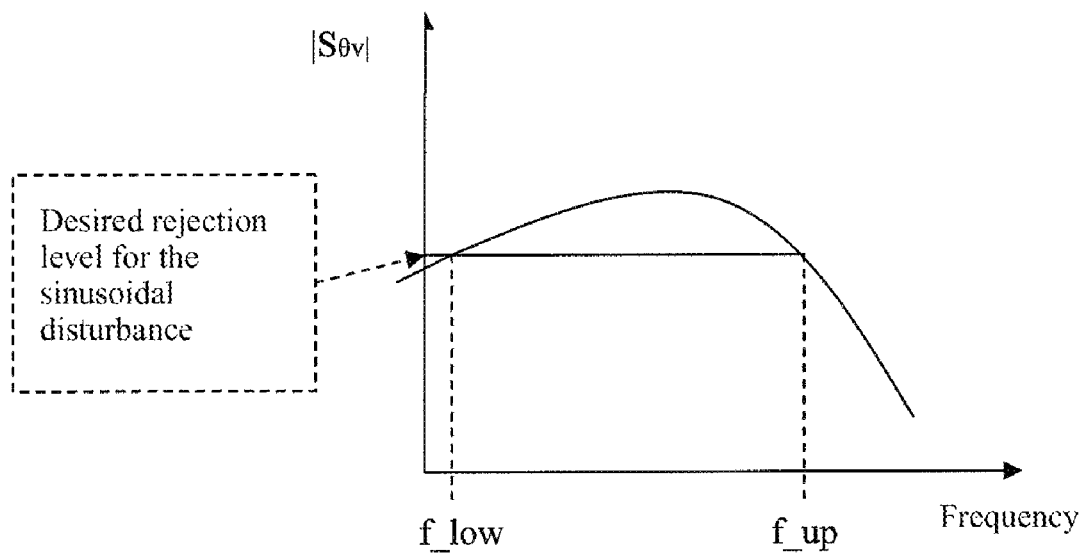
Figure 8B:
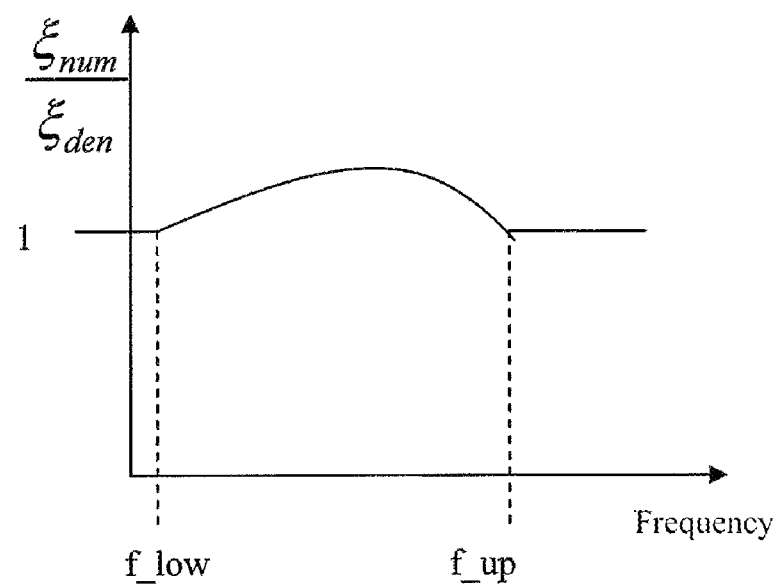
Figure 9:
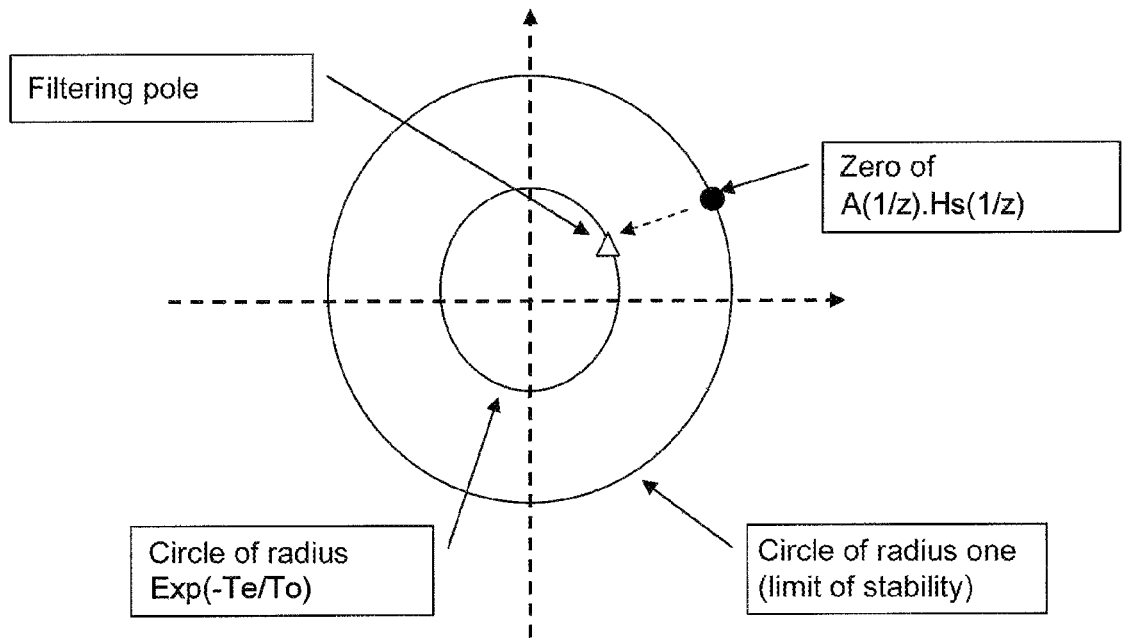
Figure 10:
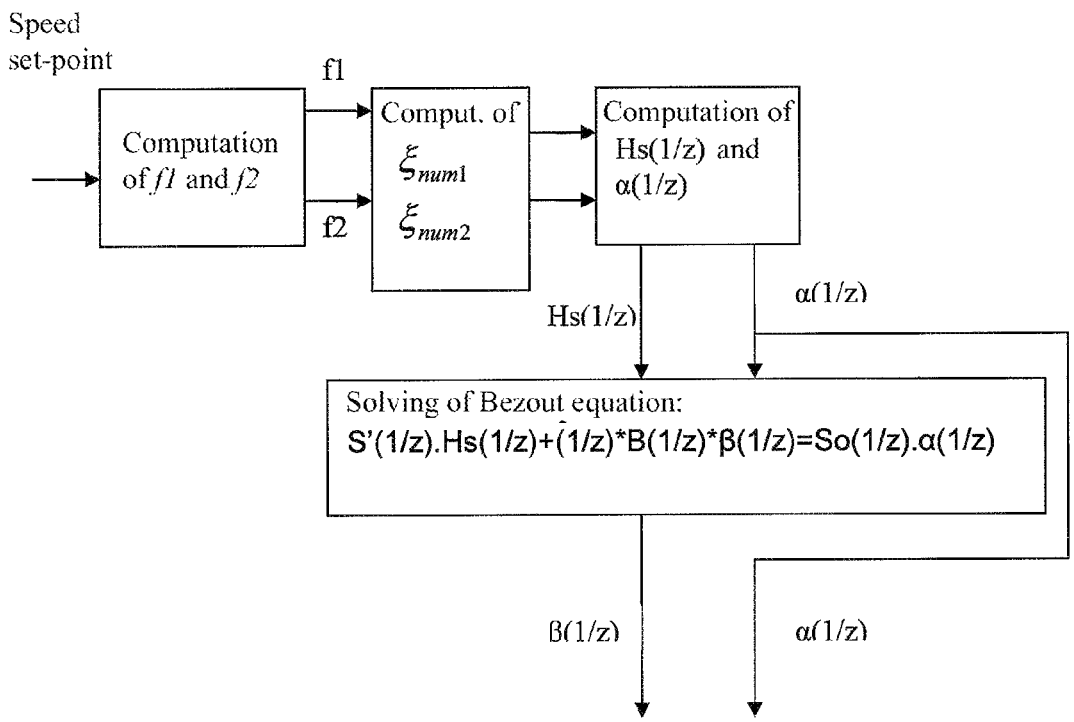
Figure 11:
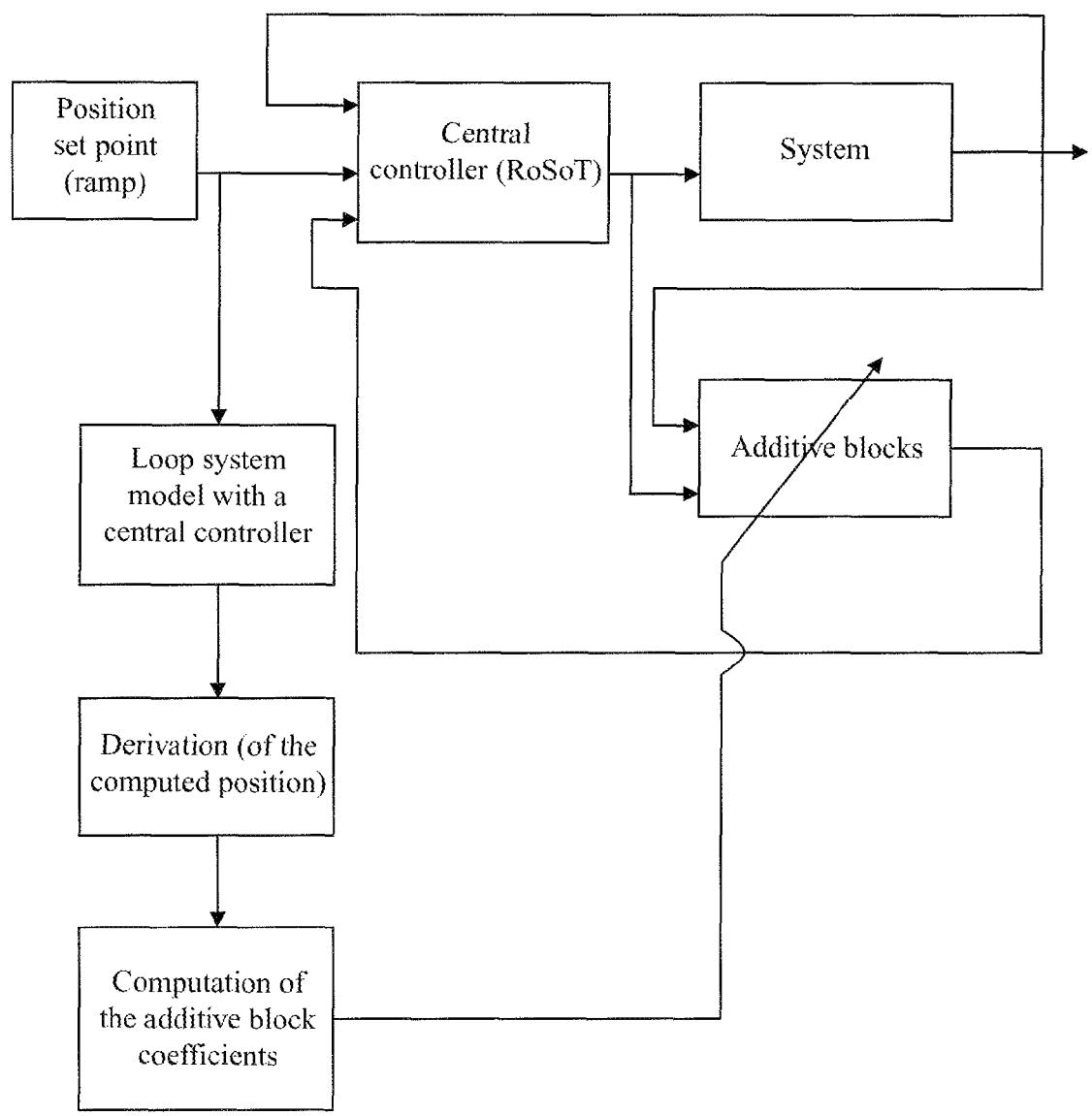
Figure 12:
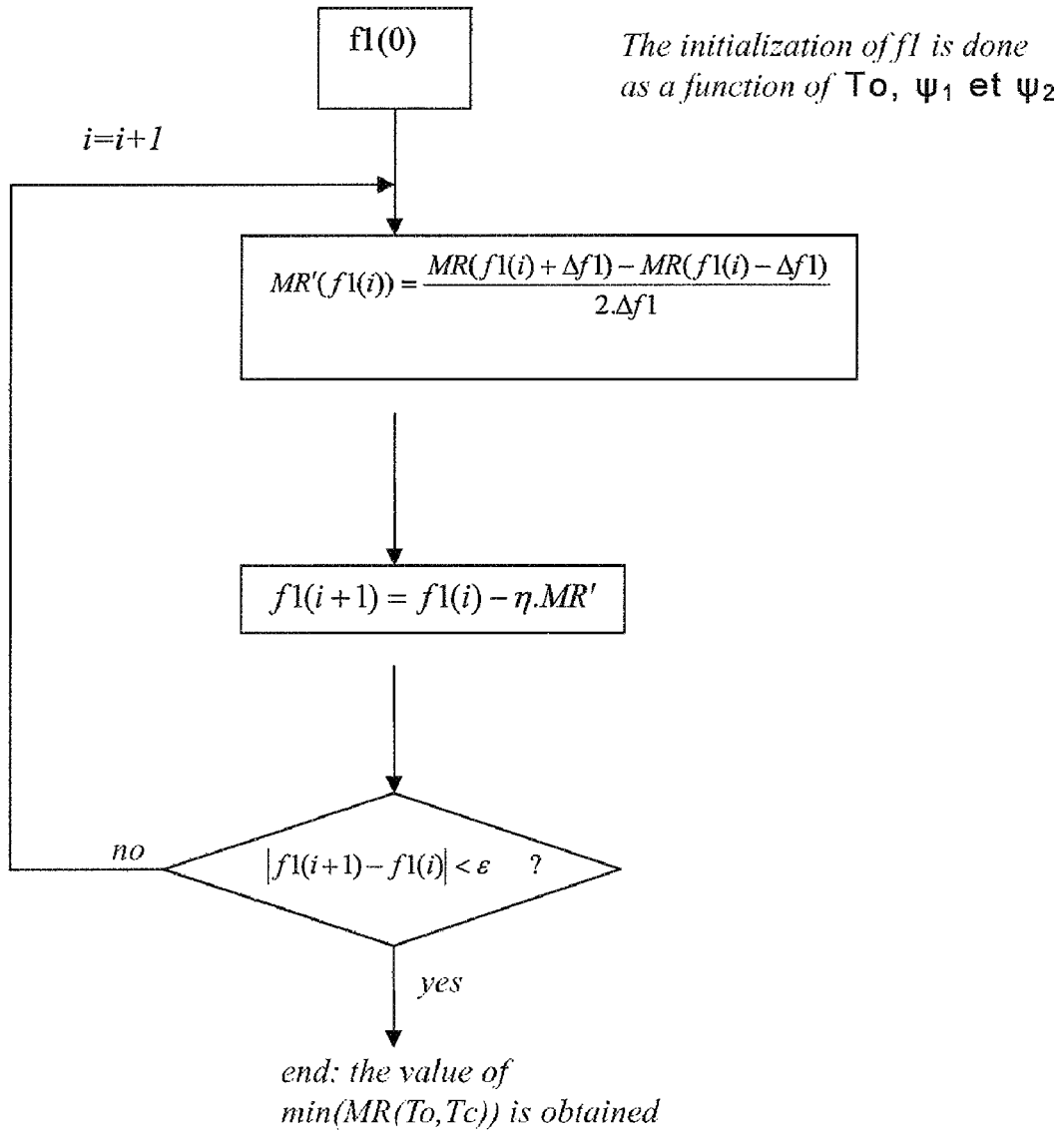
Figure 13:
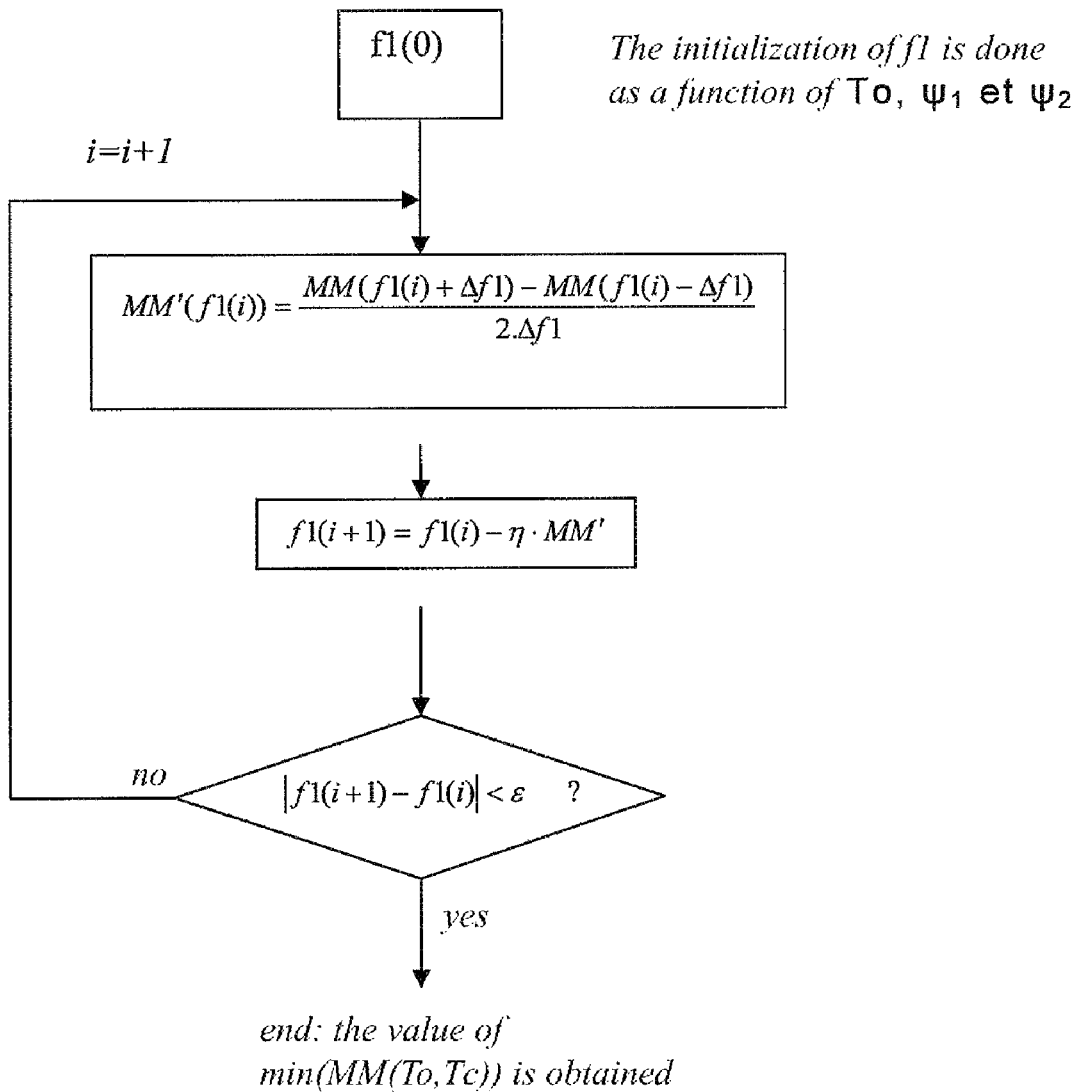
Figure 14:
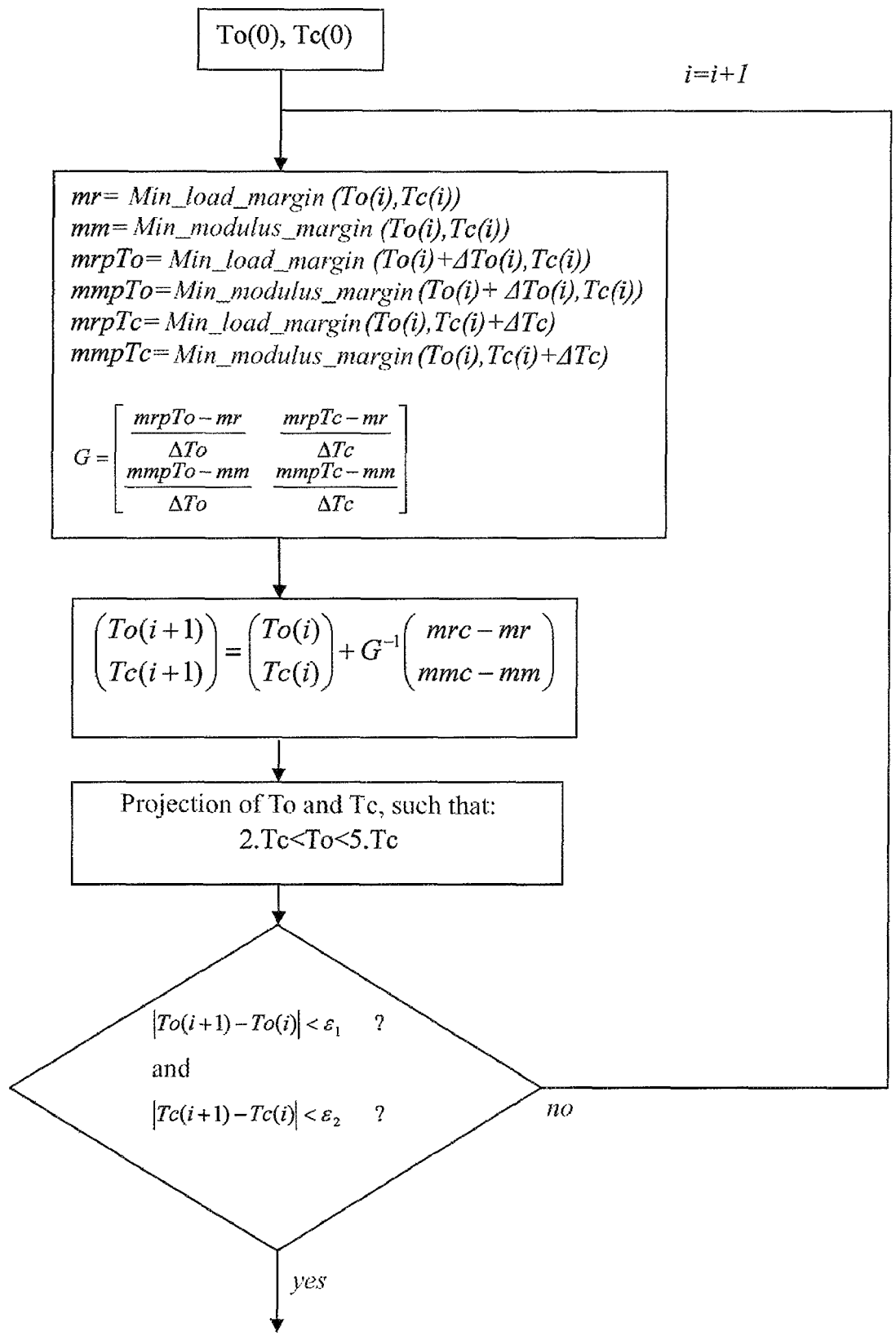

The present invention will now be exemplified, without thereby being limited, by the following description, with reference to the appended drawings, in which:

FIG. 1 shows a conventional two-degree-of-freedom RST-type controller device, having a reference input pre-filter, FIG. 2 shows an example of modulus of the sensitivity function $S_{\theta p}$ (output disturbance on the output) in the case of a closed-loop control rejecting the static disturbances with a conventional RST controller having a reference input pre-filter, FIG. 3 shows an example of modulus of the sensitivity function $S_{\theta p}$ (output disturbance on the output) in the case of a closed-loop control rejecting the static disturbances and a sinusoidal disturbance at 62.8 rad/s with a conventional RST controller having a reference input pre-filter, FIG. 4 shows a curve of the modulus $|S_{\theta v}|$ of the transfer function between the load disturbance v(t) and the output θ(t), FIG. 5 shows a curve of the modulus $|S_{\theta p}|$ of the transfer function between the output disturbance p(t) and the output θ(t), in connection with the application of the Bode-Freudenberg-Looze theorem, FIG. 6 shows a conventional control structure of the RST type, herein called central controller, FIG. 7 shows a motor-position control structure consisting of a central controller in which have been added two additional computing means, the first one being an estimator block $E(z^{-1})$ and the second one a modifier block $Q(z^{-1})$, as well as an additional loop, FIGS. 8A and 8B show curves of the modulus $|S_{\theta v}|$ of the transfer function between the load disturbance v(t) and the output θ(t), with application of a desired level of sinusoidal disturbance rejection, FIG. 8B giving the resultant of a rejection level setting to a frequency higher than a frequency f_low and lower than a frequency f_up, FIG. 9 shows, by way of example, the implementation in a complex plane of a filtering pole determination, in case there is projection of a zero of the polynomial $A(z^{-1}) \cdot Hs(z^{-1})$ because it is initially located outside a circle of radius $\exp(-Te/To)$ depending on a filtering horizon To, FIG. 10 schematically shows the steps of design of the variable-parameter modifier block, by determination of the consecutive function $\alpha(z^{-1})$ and $\beta(z^{-1})$ thereof, and FIG. 11 schematically shows the steps of computation in line within the motor-position control structure for the disturbances rejection, FIG. 12 shows the algorithm of the sub-function of computation of the delay margin minimum for the central controller (off-line) setting, FIG. 13 shows the algorithm of the sub-function of computation of the modulus margin minimum for the central controller (off-line) setting, and FIG. 14 shows the algorithm allowing to finally determine To and Tc for the central controller (off-line) setting.

To begin, the invention consists in adding two additive blocks to a conventional RST-type control structure, the latter being shown in FIG. 6. In the following description, such a RST controller is called central controller. The central controller in itself rejects only the static disturbances, the constitutive functional polynomial blocks thereof are called $Ro(z^{-1})$ and $So(z^{-1})$. Also, in the present description, the considered value is the reference input position or the reference input speed, according to the case, but these values are deduced one from the other, in a simple manner, because the reference input speed is computed by derivation of the reference input position.

There are two additive functional blocks added to the central controller. The first additive functional block, $E(z^{-1})$, produces an estimate $\hat{v}(t)$ of the load disturbances $v(t)$ and is called the estimator block. The second additive functional block, $Q(z^{-1})$, receives $\hat{v}(t)$ as an input and produces a signal that can be injected upstream from the block $So(z^{-1})$ and the coefficients thereof are computed so as to modify the sensitivity function $S_{\theta v}$ of the central controller, in order to create one or even two notches in $S_{\theta v}$, for one or even two frequencies (the case of more than two frequencies proves to be more difficult, taking into account the Bode-Freudenberg-Looze theorem), while modifying it the least possible at the other frequencies. This second block is called the modifier block. This modifier block $Q(z^{-1})$ has coefficients that vary over the time.

As shown in FIG. 7, the two inputs of the estimator block are upstream and downstream, respectively, of the system part of the RST device, and the output thereof $\hat{v}(t)$ is sent to the input of the modifier block, the output of which is sent to a subtracter (or an adder with an corresponding inverter or negative input) (the subtraction being performed or not at will, because of the presence of a switch symbol on the output of the modifier block), at the input of the RST structure. It can be noticed in this FIG. 7 that the output of the modifier block is shown as being subtracted downstream from the adder (having an inverter or negative input that indeed subtract the output of $Ro(z^{-1})$ from the input of the RST structure receiving the reference input to form de feedback). In an alternative embodiment, not shown, the output of the modifier block is subtracted upstream from the adder having an inverter or negative input receiving the feedback $Ro(z^{-1})$.

Thus, according to the case, either the additional loop is internal to the loop in $Ro(z^{-1})$ of the central controller, the additional adder (having a negative input) being located just upstream from the means for computing the function $1/So(z^{-1})$, or the additional loop is external to the loop in $Ro(z^{-1})$ of the central controller, the additional adder (having a negative input) being located upstream from the adder closing the loop in $Ro(z^{-1})$.

With reference again to FIG. 7, it can be shown that the poles of the closed-loop of the central controller alone are such that:

$$D(z^{-1})=A(z^{-1})So(z^{-1})+z^{-1}B(z^{-1})Ro(z^{-1})$$

The modifier block $Q(z^{-1})$ may be written as:

$$Q(z^{-1}) = \frac{\beta(z^{-1})}{\alpha(z^{-1})}$$

and the output thereof is injected in the RST controller.

Considering that the whole loop system thus obtained, with the two additional additive blocks (estimator and modifier blocks), is equivalent to a RST corrector having blocks $R(z^{-1})$ and $S(z^{-1})$, the following equivalence is true:

$$R(z^{-1})=\alpha(z^{-1})\cdot Ro(z^{-1})+A(z^{-1})\cdot\beta(z^{-1})$$

$$S(z^{-1})=\alpha(z^{-1})\cdot So(z^{-1})-z^{-1}\cdot B(z^{-1})\cdot\beta(z^{-1})$$

with:

$$S(z^{-1})\cdot u(t)=-R(z^{-1})\cdot\theta(t)$$

which leads to:

$$So(z^{-1})\cdot u(t) = -Ro(z^{-1})\cdot\theta(t) - Q(z^{-1})\cdot\begin{bmatrix} A(z^{-1})\cdot\theta(t) - \\ z^{-1}B(z^{-1})\cdot u(t) \end{bmatrix}$$
$$= -Ro(z^{-1})\cdot\theta(t) - Q(z^{-1})\cdot\hat{v}(t)$$

where:

$$\hat{v}(t)=A(z^{-1})\cdot\theta(t)-z^{-1}B(z^{-1})\cdot u(t)$$

Thus:

$$\frac{R(z^{-1})}{S(z^{-1})} = \frac{Ro(z^{-1})\cdot\alpha(z^{-1}) + A(z^{-1})\cdot\beta(z^{-1})}{So(z^{-1})\cdot\alpha(z^{-1}) - z^{-1}B(z^{-1})\cdot\beta(z^{-1})}$$

Accordingly, the characteristic polynomial of the closed loop may be written as:

$$D_\alpha = A(z^{-1})\cdot\begin{pmatrix} So(z^{-1})\cdot\alpha(z^{-1}) - \\ z^{-1}B(z^{-1})\beta(z^{-1}) \end{pmatrix} + z^{-1}B(z^{-1})\cdot\begin{pmatrix} Ro(z^{-1})\cdot\alpha(z^{-1}) + \\ A(z^{-1})\cdot\beta(z^{-1}) \end{pmatrix}$$

$$D_\alpha = D(z^{-1})\cdot\alpha(z^{-1})$$

Therefore, it can be seen that the denominator $\alpha(z^{-1})$ introduces additional poles into the closed loop.

Moreover, it can be shown that the sensitivity function $S_{\theta po}$ of the loop system consisting only of the central controller may be written as:

$$S_{\theta po} = \frac{A(z^{-1})\cdot So(z^{-1})}{D(z^{-1})}$$

The corresponding sensitivity function $S_{\theta p}$ for the loop system provided with the two additional additive blocks (estimator and modifier blocks) may be written as:

$$S_{\theta p} = \frac{A(z^{-1}) \cdot So(z^{-1})}{D(z^{-1})} - \frac{z^{-1} B(z^{-1}) \cdot Q(z^{-1})}{D(z^{-1})}$$

$$S_{\theta p}(z^{-1}) = S_{\theta po}(z^{-1}) - \frac{z^{-1} B(z^{-1}) Q(z^{-1})}{D(z^{-1})}$$

The sensitivity function $S_{\theta p}$ is thus affected by these additional additive blocks (estimator and modifier blocks). It can be shown that the same is true for all the sensitivity functions of the closed loop.

The result is that these two additional additive blocks (estimator and modifier blocks) can be used to modify the sensitivity function of the closed-loop control and to add poles to the loop system.

Within the framework of the invention, these two properties are used jointly. Hence, based on a central controller designed to reject only the static disturbances, two additional additive blocks (estimator and modifier blocks) are added to modify the sensitivity function $S_{\theta p}$ (and thus $S_{\theta v}$) so as to reject also one or two sinusoidal disturbances at a given frequency (besides the static disturbances), while modifying the least possible the sensitivity functions of the central controller at frequencies that are far from those of the rejection. The possibility to add poles to the closed-loop is useful to optimize the robustness of the closed loop.

It has been seen above that:

$$S(z^{-1}) = \alpha(z^{-1}) So(z^{-1}) - z^{-1} \cdot B(z^{-1}) \cdot \beta(z^{-1})$$

In order for the loop system, as provided with the two additional additive blocks (estimator and modifier blocks), to be able to reject not only the static disturbances but also the sinusoidal disturbances for at least one frequency $f_1$, it is necessary that, according to the internal model principle, the polynomial $S(z^{-1})$ is factorized as:

$$S(z^{-1}) = Hs(z^{-1}) \cdot S'(z^{-1})$$

The block Hs is itself factorized by: $(1-z^{-1})$, for static disturbance rejection.

Thus: $Hs(z^{-1}) = (1-z^{-1}) \cdot Hs1(z^{-1})$

In order to determine the parameters to be used in the device, the polynomial $Hs1(z^{-1})$ and the poles of $Q(z^{-1})$ (zeros of $\alpha(z^{-1})$) have to be computed in the purpose of creating a notch in the sensitivity functions for at least the frequency $f_1$ of $S_{\theta p}$ (and thus $S_{\theta v}$), while producing a negligible effect at the other frequencies.

A way to determine Hs1 and $\alpha$ consists in computing the transfer function:

$$\frac{Hs1(z^{-1})}{\alpha(z^{-1})}$$

by discretization of a continuous transfer function which, in the case of only one frequency $f_1$, is as follows:

$$F(s) = \frac{s^2 + 2\xi_{num} \cdot 2\pi \cdot f_1 \cdot s + (2\pi \cdot f_1)^2}{s^2 + 2\xi_{den} \cdot 2\pi \cdot f_1 \cdot s + (2\pi \cdot f_1)^2}$$

the discretization being performed by the Tustin method with pre-warping.

For more details about the choice of Hs1 and $\alpha$, reference can be made to the book of Loan Doré Landau: "Commande des systèmes", Editions Hermes, 2002.

The attenuation Mt of $S_{\theta p}$ at the frequency $f_1$ is given by:

$$Mt = 20 \cdot \log\left(\frac{\xi_{num}}{\xi_{den}}\right)$$

Thus, it is necessary that $\xi_{num} < \xi_{den}$.

A fixed value can be chosen for $\xi_{den}$, for example $\xi_{den} = 0.1$ is a suitable value. As for the value of $\xi_{num}$, it can be chosen as a function of the frequency $f_1$ to be rejected, in particular based on the modulus of $S_{\theta v}$. In particular, it can be endeavoured that the rejected disturbance is rejected at a constant level with respect to the sensitivity function $S_{\theta v}$, and, in particular, to have no rejection when the frequency is lower than f_low or higher than f_up. This determines the ratio $$\frac{\xi_{num}}{\xi_{den}},$$

as can be seen in FIGS. 8A and 8B.

So as to determine in line (real or quasi-real time) the coefficients of $\beta(z^{-1})$ of the modifier block $Q(z^{-1})$, the following equation must be solved:

$$S'(z^{-1}) \cdot Hs(z^{-1}) + z^{-1} B(z^{-1}) \cdot \beta(z^{-1}) = So(z^{-1}) \cdot \alpha(z^{-1}),$$

this equation being a Bezout equation whose unknowns are $S'(z^{-1})$ and $\beta(z^{-1})$.

Solving of this equation gives $\beta(z^{-1})$. As the parameters $\alpha(z^{-1})$ and $\beta(z^{-1})$ are determined, the modifier block is also determined.

The means implemented for determining the central controller and, later, the means for sinusoidal disturbance rejection, the principles of which have just been seen, will now been described.

The pole-placement method developed by Philippe de Larminat will now be succinctly described. This method applies within the framework of the invention, with a few adaptations.

The purpose of the pole placement according to Philippe de Larminat is to bring the RST control the closest possible to a mono-variable LQG control. It implies to choose the number of poles of the closed loop and to place them approximately where they would be placed by a LQG control.

Given $n = \deg(A)$ and $n_s = \deg(Hs)$.

Philippe de Larminat proposes that the number of poles of the closed loop (which is in any case higher than or equal to $2 \cdot n$) is equal to $2 \cdot n + n_s$.

The poles are then grouped into two groups:
the pole group, called "filtering group", comprising $n + n_s$ poles,
the pole group, called "command group", comprising n poles.

The terms "filtering" and "command" are used by analogy with a reconstructed state feedback control.

The determination of the filtering poles results from the analysis of the zeros of the polynomial $A(z^{-1}) \cdot Hs(z^{-1})$ and from their modifications or not according to their respective positions in the complex plane. Thus, the zeros of the polynomial $A(z^{-1}) \cdot Hs(z^{-1})$ are projected onto a circle centred on zero and of radius $\exp(-Te/To)$ if they are external to this circle, and they are leaved unchanged if they are internal to or on the circle. To is called "filtering horizon" and is a temporal variable, and Te is the sampling period. It will be noted that this process is a transposition to the discrete case of the methodology of Philippe de Larminat, which has been initially designed for continuous systems and the details of which can be found in "Automatique, commande des systèmes linéaires", Hermes, 1996. This process applies for stable poles or poles at the limit of stability. It is to be noted that, in the present case, the system is of the double-integrator type and, therefore, there is no strictly unstable pole, the poles can only be in limit of instability. FIG. 9 schematically shows this determination step, in case there is projection of a zero of the polynomial $A(z^{-1}) \cdot Hs(z^{-1})$ because it is initially located outside the circle of radius $\exp(-Te/To)$.

The determination of the command poles results from the analysis of the zeros of the polynomial $A(z^{-1})$ and of their modifications or not according to their respective positions. The processing applied to these zeros is similar to the preceding one, except that the horizon Tc, called "command horizon", is this time smaller that the filtering horizon To. The processing thus consists in taking the zeros of $A(z^{-1})$ and projecting them in a similar way on a circle of centre 0 and radius $\exp(-Te/Tc)$ if they are outside said circle, or leaving them unchanged in the opposite case. It is to be noted again that such processing is a transposition to the discrete case of the methodology of Philippe de Larminat, which has been initially designed for the continuous systems and the details of which can be found in "Automatique, commande des systèmes linéaires", Hermes, 1996. As indicated, Tc, which is the command horizon, is smaller than To. Preferably: To/5<Tc<To/2.

This pole-placement strategy aims to bring the control the closest possible to the LQG-LTR control. This way of doing has the advantage that it can set a RST controller by means of two high-level parameters having distinct effects.

Now, let $F(z^{-1})$ be the filtering polynomial whose zeros are the filtering poles, and $C(z^{-1})$ be the command polynomial whose zeros are the command poles.

The second term of the Bezout equation for computing the RST controller, $D(z^{-1})$, may be written as:

$$D(z^{-1}) = F(z^{-1}) \cdot C(z^{-1})$$

Using as a model a reconstructed state feedback control, in which the state observer is non-observable from the output as in the methodology of Philippe de Larminat, the polynomial $T(z^{-1})$ of the RST block is then chosen such as:

$$T(z^{-1}) = F(z^{-1}).$$

The transfer function between w(t) and θ(t) may then be written as:

$$\frac{\theta(t)}{w(t)} = \frac{z^{-1} B(z^{-1})}{C(z^{-1})}$$

It can thus be seen that the command poles have a clear influence on the reference input tracking. As for them, the filtering poles have an influence on the disturbance rejection.

Considering by way of example the case of the system behaving as a double integrator, $A(z^{-1})$ has two zeros in +1. As for the static disturbance rejection, $Hs(z^{-1}) = 1 - z^{-1}$ has one zero in +1.

The result is that, during the processing of the zeros, the three zeros of $A(z^{-1}) \cdot Hs(z^{-1})$ are projected in $\exp(-Te/To)$ to form the filtering polynomial $F(z^{-1})$. To form the command polynomial $C(z^{-1})$, the two zeros of $A(z^{-1})$ are projected in $\exp(-Te/Tc)$.

The polynomials $F(z^{-1})$ and $C(z^{-1})$ being thus determined, the Bezout equation has to be solved to determine $Ro(z^{-1})$ and $So(z^{-1})$.

The controller synthesis method of Philippe de Larminat which has just been presented and applied to a particular system is used within the framework of the invention. It is used as a base for the central controller synthesis and it is complemented by a method for the rejection of one or more sinusoidal disturbance(s).

It has been seen above that, in case it is desired to eliminate a sinusoidal disturbance at the frequency $f_1$, in addition to the static disturbances, the polynomial Hs needs to be writable as:

$$Hs(z^{-1}) = (1 - z^{-1}) \cdot Hs1(z^{-1})$$

Moreover, it is necessary to add poles to the loop system for robustness reasons, i.e. to the polynomial $D(z^{-1})$, so that the polynomial of the closed loop may be written as:

$$D(z^{-1}) \cdot \alpha(z^{-1}).$$

Hs1 and α can be chosen through the above-mentioned computing.

As seen above, the conclusion is that the following relation must be true: $\xi_{num} < \xi_{den}$.

This way of doing has the advantage that a notch can be created in the direct sensitivity function, which is $S_{\theta p}$, without noticeable effect in the sensitivity function at frequencies that are far from $f_1$.

The value of $\xi_{den}$ determines the width of the "notch" which appears in the sensitivity function. A value of 0.1 can be chosen and be fixed once and for all.

By way of a new example, in case it is desired to reject simultaneously two sinusoidal disturbances at the frequencies $f_1$ and $f_2$ (in particular, when $f_2 = 2 \ast f_1$, i.e. a fundamental frequency and a harmonic) will now be described. In this case, the discrete transfer function:

$$\frac{Hs1(z^{-1})}{\alpha(z^{-1})}$$

has to be obtained from the following continuous transfer function:

$$F(s) = \frac{s^2 + 2\xi_{num1} \cdot 2\pi \cdot f_1 \cdot s + (2\pi \cdot f_1)^2}{s^2 + 2\xi_{den1} \cdot 2\pi \cdot f_1 \cdot s + (2\pi \cdot f_1)^2} \cdot \frac{s^2 + 2\xi_{num2} \cdot 2\pi \cdot f_2 \cdot s + (2\pi \cdot f_2)^2}{s^2 + 2\xi_{den2} \cdot 2\pi \cdot f_2 \cdot s + (2\pi \cdot f_2)^2}$$

in which $\xi_{num1}$ and $\xi_{den1}$ relate to the frequency $f_1$ and $\xi_{num2}$ and $\xi_{den2}$ relate to the frequency $f_2$.

In this case, for example, the value $\xi_{den1} = \xi_{den2} = 0.1$ can be fixed, and the value of $\xi_{num1}$ and $\xi_{num2}$ can be chosen as a function of $f_1$ and $f_2$.

Generally, it can be said that, given MR0 and MM0 the delay and modulus margins of the central controller, respectively, the margins of the loop system rejecting additionally one or even two sinusoidal disturbances at the frequencies $f_1$ and $f_2$ will be lower that MR0 and MM0.

Let $MR(f_1, f_2)$ be the modulus margin of the loop system rejecting two sinusoidal disturbances at the frequencies $f_1$ and $f_2$, the following relation is true:

$$MR(f_1, f_2) < MR0.$$

Let MM($f_1,f_2$) be the delay margin of the loop system rejecting two sinusoidal disturbances at the frequencies $f_1$ and $f_2$, the following relation is true:

$$MM(f_1,f_2) < MM0.$$

In the implementation example given in the following description, it is considered that the sinusoidal disturbance rejection consists in rejecting a fundamental disturbance at the frequency $f_1$ and rejecting the second harmonic at the frequency $f_2=2*f_1$.

Suppose that the parameters To and Tc of the central controller have already been defined in the case of a particular setting. The sensitivity function $S_{\theta v}$ can be computed from this set of parameters, as well as the norm H∞ which represents the maximum of the modulus $S_{\theta v}$.

Let $\Psi_1$ be the chosen level for the attenuation of the fundamental of the load disturbance at the maximum frequency of $S_{\theta v}$.

Let $\Psi_2$ be the chosen level for the attenuation of the harmonic 2 of the fundamental of the load disturbance at the maximum frequency of $S_{\theta v}$.

Then, when it is wanted that the desired level of absolute rejection of the disturbance is the same for all the useful frequencies, the values $\xi_{num1}(f)$ and $\xi_{num2}(f)$ are deduced by means of the following relations:

$$\xi_{num1}(f) = \min\left(\frac{\xi_{den1}\cdot\psi_1}{|S_{\theta v}(f)|}, \xi_{den1}\right)$$

$$\xi_{num2}(f) = \min\left(\frac{\xi_{den2}\cdot\psi_2}{|S_{\theta v}(f)|}, \xi_{den2}\right)$$

The values $\xi_{num1}(f)$ and $\xi_{num2}(f)$ are determined during the (off-line) synthesis (or design) of the central controller and can next be integrated into the calculator, in the form of tables.

As for the varying-parameter polynomials of the modifier block $Q(z^{-1})$, which are $\alpha(z^{-1})$ and $\beta(z^{-1})$, they are determined in line (real or quasi-real time) according to the procedure steps shown in FIG. 10 for each reference input speed.

In a first time, the frequency(ies) of the sinusoidal disturbance(s) to be rejected are computed and, in the example of FIG. 10, two frequencies are computed.

In a second time, for each frequency, the corresponding $\xi_{num}$ is computed.

In a third time, $Hz(z^{-1})$ and $\alpha(z^{-1})$ are computed.

Finally, the following Bezout equation:

$$S'(z^{-1})\cdot Hs(z^{-1})+(z^{-1})\cdot B(z^{-1})\cdot\beta(z^{-1})=So(z^{-1})\cdot\alpha(z^{-1})$$

is solved to determine $\beta(z^{-1})$. Once, these parameters $\alpha(z^{-1})$ and $\beta(z^{-1})$ computed, the modifier block is determined, because $$Q(z^{-1}) = \frac{\beta(z^{-1})}{\alpha(z^{-1})}$$

and the output thereof, which will be sent (if choice be) to the subtracter, toward the input of the RST controller, can be computed from the load disturbance estimate $\hat{v}(t)$ that is produced by the estimator block.

It is necessary that the central controller can be set (off-line) and this possibility will thus be described now.

In practice, the method for setting the central controller consists in computing To and Tc under the constraint that whatever the sinusoidal disturbance frequency(ies) the minimum delay and modulus margins must be effectively respected.

Let mrc be the "target" delay margin, i.e. the delay margin to be imperatively respected whatever the disturbance frequency to be rejected.

Let mmc be the "target" modulus margin, i.e. the modulus margin to be imperatively respected whatever the disturbance frequency to be rejected.

It is endeavoured to determine To and Tc so that the dynamic performances are the best possible, taking into account the constraints on mrc and mmc, these margins having been fixed beforehand.

The algorithm presented hereinafter is intended to be implemented by means of a programmed automaton (for example, wired or pre-programmed by a ROM) or programmable with the adapted program and notably in a computer or calculator that can be programmed by a program.

To simplify, in this example, $\xi_{den1}$ and $\xi_{den2}$ are supposed to be fixed once and for all, and the same is supposed for the values of $\Psi_1$ and $\Psi_2$, which are also fixed. Moreover, in this simplified example, it is considered that $f_2=2*f_1$, so that the functions that will follow depend only on $f_1$.

In particular, the following functions are used:

[MR,MM]=margins(To,Tc):

This function determines the delay margin MR and the modulus margin MM of the loop system, for a set of parameters To and Tc, by computation of the minimum of the delay margins over all the disturbance frequency range $f_1$, as a function of given To and Tc. MR is computed by means of a sub-function "delay_margin_min", MM is computed by means of a sub-function "modulus_margin_min".

These sub-functions are based on optimization computations which are more efficient if the starting values that can be taken are not too far from those relating to the required optimum. And it can be shown that some of these starting values can be deduced from parameters that are fixed or known/computed a priori.

Indeed, the curve of the delay margin as a function of $f_1$ (frequency of the disturbance fundamental and in case $f_2=2*f_1$) can be computed, as well as the curve of the modulus margin as a function of $f_1$, for a given attenuation level of the fundamental $f_1$, $\Psi_1$, of the disturbance to be rejected, and for a given attenuation level of the harmonic $f_2$, $\Psi_2$, of the disturbance to be rejected. The corresponding curves each have local minima and a global minimum. Numerous empirical tests have shown that, for a fixed set of parameters $\Psi_1$ and $\Psi_2$, the frequency of the global minimum on each of the corresponding curves varies only as a function of To and Tc, and can be coarsely approximated from the known frequency of the maximum of $S_{\theta po}$. It has thus been shown that the frequency of the minimum of MR($f_1$), for a given configuration of $\Psi_1$ and $\Psi_2$ is coarsely equal to half the frequency of the maximum of $S_{\theta po}$ and extensive tests have also shown that this property is kept whatever To and Tc, provided that $\Psi_1$ and $\Psi_2$ does not vary. The same is true for the curve MM($f_1$), the local minimum of the curve is coarsely at a frequency which is equal to two times the frequency of the maximum of $S_{\theta po}$. The latter property is kept whatever To and Tc, provided that $\Psi_1$ and $\Psi_2$ does not vary. These coarse indications about the frequency location of the global minimum of each of the two curves provide a starting point for the optimisation algorithm (for example, Newton), the convergence of which toward the minimum is ensured if the initialization frequency of the algorithm is sufficiently close to the global minimum. The load margin minimum and the modulus margin minimum can thus be efficiently determined by optimization when the rejection of sinusoidal disturbances is ensured.

[MR]=delay_margin_min($f_1$,To,Tc):

This sub-function computes the minimum of MR($f_1$) for given values of To and Tc, over the full range of values of $f_1$. This computation can be done by optimization with a descent algorithm, for example the secant algorithm, provided that the algorithm is initialized with a value of $f_1$ close to the optimum which can be coarsely known depending of To, $\Psi_1$ and $\Psi_2$. The corresponding algorithm for computing the load margin minimum for a given set of parameters To, Tc ($\Psi_1$ and $\Psi_2$ having been fixed once and for all before the computations) is shown in FIG. 12. At the beginning, a value $f_1(0)$ is used, which depends on To, $\Psi_1$ and $\Psi_2$ and which is close to the optimum as explained above. By iterative steps in which variations with various orders are considered, the minimum of MR(To, Tc) is determined taking as a stop criterion the fact that the variation of $f_1$ from one iteration to the other becomes, in absolute value, lower than a predefined threshold $\epsilon$.

[MM]=modulus_margin_min($f_1$,To,Tc):

This sub-function computes the minimum of MM($f_1$) for given values of To and Tc, over the full range of values of $f_1$. This computation can be done by optimization with a descent algorithm, for example the secant algorithm, provided that the algorithm is initialized with a value of $f_1$ close to the optimum which can be coarsely known depending of To, $\Psi_1$ and $\Psi_2$. The corresponding algorithm for computing the modulus margin minimum for a given set of parameters To, Tc ($\Psi_1$ and $\Psi_2$ having been fixed once and for all before the computations) is shown in FIG. 13. At the beginning, a value $f_1(0)$ is used, which depends on To, $\Psi_1$ and $\Psi_2$ and which is close to the optimum as explained above. By iterative steps in which variations with various orders are considered, the minimum of MM(To,Tc) is determined taking as a stop criterion the fact that the variation of $f_1$ from one iteration to the other becomes, in absolute value, lower than a predefined threshold $\epsilon$.

In the function [MR,MM]=margins(To,Tc), an optimization is done so as to determine the values To and Tc which permit that MR=mrc and MM=mmc. In particular, this optimization can be performed by using the "projected Newton" algorithm so as to respect the constraint To/5<Tc<To/2 given above by way of example. The corresponding algorithm is shown in FIG. 14 with iterative optimization computations under constraint and having as a stop criterion the fact that To and Tc vary from one iteration to the other only in an insignificant manner (absolute variations lower than predefined thresholds $\epsilon_1$ and $\epsilon_2$).

FIG. 11 gives a structural-functional diagram of an application of the invention with a position reference input in the form of a ramp signal as an input. This application combines computation means, notably of the type computer with a program, and effector means, notably a motor and at least one sensor (or encoder) which outputs position information about the motor. On the one hand, this position reference input goes through a central controller whose parameters or coefficients have been initially computed (in an alternative, they can be computed in real time) and which produces a control signal for the part comprising the motor (called "system" in FIG. 11). The additive blocks (estimator and modifier blocks) receive as inputs the output signals of the central controller and the motor (the sensor thereof), and produce a signal that is reinjected at the input of the central controller (preferably, this reinjected signal can be used or not, thanks to a switch, as shown in FIG. 7). As the additive blocks, in practice the modifier block, have varying parameters (or coefficients, these terms being equivalent), they are determined in real or quasi-real time from the position reference input by computations based on a model comprised of a loop system with a central controller from which the computed position can be derived and finally said coefficients be computed.

It will be understood that the term "signal" as used in the present description has to be considered in the full meaning of the word and that, according to the place where it is situated and the physical means implemented, it can corresponds to numerical values (sampled digital signal) or to an analog signal (motor current, for example), and that adapted conversion devices are implemented in order to make the signal compatible with the units with which it cooperates. For example, a digital-to-analog converter can be implemented in the central controller for driving the motor. Also, an analog-to-digital or frequency-to-digital converter can be implemented at the sensor output. In practice, the signals that are submitted to computations are sampled and are digital signals.

The examples are given by way of illustration and permit to better understand that the methods used can apply to other configurations more or less advanced, notably regarding the accuracy of the system model or the degree thereof.

It will be understood that the invention includes technical equivalents to the described means. Thus, data or signals can be deduced from one another by simple operations, as for example the evolving position and the speed, and it is then possible to track either one of the parameters to deduce the other one. Further, the operations/functions can be decomposed or distributed in a different manner. For example, the modifier block can produce an inverted modified signal which will next be sent to a positive input (an addition is performed instead of a subtraction, unlike the case of a negative or inverted input as shown in FIG. 7) of the upstream adder of the function 1/So($z^{-1}$).

The invention claimed is:

1. A method for rejecting periodic disturbances in a motor-position control structure, the periodic disturbances corresponding to at least one sinusoidal oscillation at a determinable frequency proportional to an angular speed of a motor, the control structure receiving a position reference input signal c(t) implementing a first loop for controlling a position of an axis of the motor, said control structure being an RST controller and being sampled so that numerical computations can be made in a programmable calculator to produce results to control the motor, the RST controller implementing computing means corresponding to a function 1/So($z^{-1}$) upstream from the motor and producing a control signal u(t) and a function Ro($z^{-1}$) in the first loop which receives as an input a position signal θ(t) from a position sensor on said motor axis, z being an operator advance of one sampling period, R and S being polynomial functions in the RST controller, wherein an assembly including the motor, the position sensor, the means for computing the functions 1/So ($z^{-1}$) and Ro($z^{-1}$) in the first loop, is called a central controller, the method comprising:
adding to the central controller two additional computing means, the first one being an estimator block E($z^{-1}$) and the second one a modifier block Q($z^{-1}$), as well a second loop,
modeling the motor as a modeled system subjected to a load disturbance v(t), said modeled system receiving the control signal u(t) as an input and producing the position signal θ(t) as an output, the system model applying a function $z^{-1}$B($z^{-1}$) to the control signal u(t) to produce a signal added to the load disturbance v(t), the resultant being subjected to a function 1/A ($z^{-1}$) to produce the position signal θ(t), computing a load disturbance estimation signal $\hat{v}(t)$ in the estimator block $E(z^{-1})$ that receives the control signal $u(t)$ as a first input and the position signal $\theta(t)$ as a second input, and in which the control signal $u(t)$ is subjected to the function $z^{-1}B(z^{-1})$ to produce a signal, which is then subtracted from the result of the application of the function $A(z^{-1})$ to the position signal $\theta(t)$, this subtraction giving the load disturbance estimation signal $\hat{v}$, and applying the load disturbance estimation signal $\hat{v}(t)$ to the modifier block $Q(z^{-1})$ to produce a modified signal, which is applied to a negative input of an additional adder arranged upstream from the means for computing the function $1/So(z^{-1})$ and then forming the second loop, the modifier block having a transfer function that varies as a function of the at least one determinable frequency and which is computed in real or quasi-real time under a constraint that a position sensitivity function $S_{\theta p}$ of the control structure comprises a notch for the at least one determinable frequency, with the central controller rejecting only static disturbances.

2. The method according to claim 1, wherein the second loop is internal to the first loop in $Ro(z^{-1})$ of the central controller, the additional adder being arranged upstream from the means for computing the function $1/So(z^{-1})$.

3. The method according to claim 1, wherein the central controller is arranged beforehand, off-line, to reject the static disturbances and the functions So and Ro are stored to be used later during the real or quasi-real time computations.

4. The method according to claim 3, wherein, during the central controller design in which is performed a step of determining a filtering horizon To and a command horizon Tc, such that Tc<To, said step of determining the filtering horizon To and the command horizon Tc is performed under a constraint that regardless of the one or more frequencies to be rejected, a delay margin is higher than a predetermined threshold delay margin mrc and a modulus margin is higher than a predetermined threshold modulus margin mmc.

5. The method according to claim 4, wherein, in the step of determining the filtering horizon To and the command horizon Tc under constraint, a set of minima of the delay margins and modulus margins is computed, wherein the minima are a function of possible values of the one or more frequencies to be rejected and are also obtained by varying the values of To and Tc, and wherein, based on the set of minima for the delay margins and modulus margins, the values To and Tc make sure that the constraints that the delay margin is higher than the predetermined threshold delay margin mrc and that the modulus margin is higher than the predetermined threshold modulus margin mmc are met.

6. The method according to claim 1, wherein the transfer function $Q(z^{-1})$ of the modifier block is computed using a polynomial ratio $$Q(z^{-1}) = \frac{\beta(z^{-1})}{\alpha(z^{-1})}$$

having varying parameters, and the whole control structure is equivalent to the RST controller in R and S of polynomial function blocks $R(z^{-1})=\alpha(z^{-1})\cdot Ro(z^{-1})+A(z^{-1})\cdot\beta(z^{-1})$ $S(z^{-1})=\alpha(z^{-1})\cdot So(z^{-1})-z^{-1}\cdot B(z^{-1})\cdot\beta(z^{-1})$ the polynomial function $S(z^{-1})$ is factorized as pre-specified into $S(z^{-1})=Hs(Z^{-1})\cdot S'(z^{-1})$ to bring out a term in $(1-z^{-1})$ corresponding to the static disturbance rejection and terms $S'(z^{-1})$ and $Hs1(z^{-1})$, wherein $S(z^{-1})$ is written $S(z^{-1})=(1-z^{-1})\cdot Hs1(z^{-1})\cdot S'(z^{-1})$, and wherein the polynomials Hs1 and $\alpha$ are determined by discretization of a continuous transfer function depending on a desired rejection level Mt at the considered frequency, the polynomial $\beta$ being then obtained by solving the following Bezout equation $S'(z^{-1})\cdot Hs(z^{-1})+z^{-1}B(z^{-1})\cdot\beta(z^{-1})=So(z^{-1})\cdot\alpha(z^{-1})$.

7. The method according to claim 6, wherein the continuous transfer function depending on the desired rejection level at the considered frequency, in the case of only one frequency $f_1$, is:

$$F(s) = \frac{s^2 + 2\xi_{num}\cdot 2\pi\cdot f_1\cdot s + (2\pi\cdot f_1)^2}{s^2 + 2\xi_{den}\cdot 2\pi\cdot f_1\cdot s + (2\pi\cdot f_1)^2}.$$

8. The method according to claim 6, wherein the continuous transfer function depending on the desired rejection level at the considered frequency, in the case of two frequencies $f_1$ and $f_2$, is:

$$F(s) = \frac{s^2 + 2\xi_{num1}\cdot 2\pi\cdot f_1\cdot s + (2\pi\cdot f_1)^2}{s^2 + 2\xi_{den1}\cdot 2\pi\cdot f_1\cdot s + (2\pi\cdot f_1)^2} \cdot \frac{s^2 + 2\xi_{num2}\cdot 2\pi\cdot f_2\cdot s + (2\pi\cdot f_2)^2}{s^2 + 2\xi_{den2}\cdot 2\pi\cdot f_2\cdot s + (2\pi\cdot f_2)^2}.$$

9. The method according to claim 6, wherein the desired rejection level Mt for a given frequency $f_i$ is computed by $Mt_i=20\cdot\log(\xi num_i/\xi den_i)$.

10. A device for rejecting periodic disturbances in a motor-position control structure, the periodic disturbances corresponding to at least one sinusoidal oscillation at a frequency proportional to an angular speed of a motor, the control structure receiving a position reference input signal $c(t)$ implementing a first loop for controlling a position of an axis of said motor, said control structure being an RST controller and being sampled so that numerical computations can be made in a programmable calculator to produce results to control the motor, the RST controller implementing computing means corresponding to a function $1/So(z^{-1})$ upstream from the motor and producing a control signal $u(t)$ and a function $Ro(z^{-1})$, in the first loop which receives as an input a position signal $\theta(t)$ from a position sensor on said motor axis, z being an operator advance of one sampling period, R and S being polynomial functions in the RST controller, the device comprising:

a central controller including the motor, the position sensor, the means for computing the functions $1/So(z^{-1})$ and $Ro(z^{-1})$, in the first loop; and added to the central controller, two additional computing means, the first one being an estimator block $E(z^{-1})$ and the second one a modifier block $Q(z^{-1})$, as well as a second loop, the estimator block $E(z^{-1})$ allowing a load disturbance estimation signal $\hat{v}(t)$ to be computed, said estimator block receiving the control signal $u(t)$ as a first input and the position signal $\theta(t)$ as a second input, the modifier block $Q(z^{-1})$ receiving the load disturbance estimation signal $\hat{v}(t)$ as an input to produce a modified signal, which is applied to a negative input of an additional adder arranged upstream from the means for computing the function $1/So(z^{-1})$ and then forming the second loop, the modifier block having a transfer function that varies as a function of the at least one determinable frequency and which is computed in real or quasi-real time under a constraint that a position sensitivity function $S_{\theta p}$ of the control structure comprises a notch for the at least one determinable frequency, with the central controller rejecting only static disturbances.

11. The method according to claim 2, wherein the central controller is arranged beforehand, off-line, to reject the static disturbances and the functions So and Ro are stored to be used later during the real or quasi-real time computations.

12. The method according to claim 7, wherein the desired rejection level Mt for a given frequency $f_i$ is computed by $Mt_i = 20 \cdot \log(\xi num_i / \xi den_i)$.

13. The method according to claim 8, wherein the desired rejection level Mt for a given frequency $f_i$ is computed by $Mti = 20 \cdot \log(\xi num_i / \xi den_i)$.

* * * * *